United States Patent [19]

Spindler et al.

[11] Patent Number: 5,509,538

[45] Date of Patent: Apr. 23, 1996

[54] PAPERLESS ORDER PICKING SYSTEM

[75] Inventors: Jeffrey D. Spindler, Ann Arbor; Kenneth E. Burkhalter, Jr., Chelsea, both of Mich.; Alfred W. Iversen, Upper Montclair, N.J.

[73] Assignee: Amphion Inc., Ann Arbor, Mich.

[21] Appl. No.: 71,897

[22] Filed: Jun. 3, 1993

[51] Int. Cl.$^6$ ................................. B07C 7/04; B65G 1/00
[52] U.S. Cl. .................... 209/630; 209/702; 209/942; 198/370.01; 414/273
[58] Field of Search ................... 198/346, 349, 198/350, 365, 370, 370.01, 370.03; 209/545, 630, 702, 912, 942; 414/273

[56] References Cited

U.S. PATENT DOCUMENTS

| | | | |
|---|---|---|---|
| 4,719,694 | 1/1988 | Herberich et al. | 414/273 X |
| 4,792,273 | 12/1988 | Specht | 414/786 |
| 4,820,101 | 4/1989 | Fenn | 414/21 |
| 4,921,087 | 5/1990 | Nakamura | 198/350 |
| 5,054,601 | 10/1991 | Sjogren et al. | 198/370.04 |
| 5,113,349 | 5/1992 | Nakamura et al. | 364/478 |

FOREIGN PATENT DOCUMENTS

| | | | |
|---|---|---|---|
| 0007605 | 1/1984 | Japan . | |
| 0280107 | 12/1987 | Japan . | |
| 0066005 | 3/1988 | Japan . | |
| 0066004 | 3/1988 | Japan . | |
| 0267604 | 11/1988 | Japan . | |
| 0162605 | 6/1989 | Japan . | |
| 0150605 | 6/1989 | Japan . | |
| 0081809 | 3/1990 | Japan | 414/273 |
| 0221004 | 9/1990 | Japan | 414/273 |
| 0147603 | 6/1991 | Japan | 414/273 |

OTHER PUBLICATIONS

Litton Software Systems Brochure Mar. 1993.

*Primary Examiner*—William E. Terrell
*Assistant Examiner*—Tuan Nguyen
*Attorney, Agent, or Firm*—Young, MacFarlane & Wood

[57] ABSTRACT

A system and method for paperless, self-contained partial case picking of goods in a distribution center for cartons or containers subsequently shipped to a customer store. A set of cartons or containers is moved along a pick face in a series of move cycles. Operator display units provided at the pick face prompt workers to distribute goods from batches on the pick face to the cartons. The operator display units define contiguous put zones for each worker and assign each worker to particular batches of goods for each move cycle. The operator display units can include key entry means for the workers to signal the end of pick cycles, and in one embodiment to adjust pick quantities and distributions in real time according to changing circumstances. The put and pick zone assignments are reconfigured for each move cycle depending on factors such as worker ability and the picking difficulty of the batches assigned. In a preferred embodiment a mobile array of put stations runs along the pick face and is controlled by a computer, each put station on the array carrying an operator display/interface for assignment of put and pick zones.

25 Claims, 4 Drawing Sheets

PAPERLESS ORDER PICKING SYSTEM

FIELD OF THE INVENTION

The present invention is generally related to paperless goods-picking systems for partial case picking, in which workers select goods from pre-sorted batches delivered to a "pick face" for distribution into containers for shipping to customer stores. Means are provided along the pick face to prompt workers to make certain selections and distributions of the goods from the flow racks to the containers.

BACKGROUND OF THE INVENTION

Warehouse distribution centers receive large numbers of goods from the manufacturers which must be efficiently sorted, packed and shipped in accordance with orders from customer stores. Typically, the goods arrive and are sorted into "stock keeping unit" or "SKU" batches by type, size, color, etc. These SKU batches are then transferred to a "pick face" where workers select from among the batches as they arrive and distribute them among one or more shipping cartons or containers according to written manifests. Delivery to the pick face is typically via conveyor-type racks which transport the batches in order of loading to workers stationed at their opposite ends, the "pick face". Conveyor or other take-away means are usually provided at the pick face, receiving filled shipping cartons and transporting them to other parts of the distribution center for further processing and loading onto waiting transport vehicles.

The SKU batches are typically identified by an SKU number, which is a barcode-type identifier for a particular type, size, color of goods. All of the items or sets of items in an SKU batch are typically the same merchandise and have the same SKU number.

There may be dozens or hundreds of flow racks in a pick face, with workers typically servicing more than one rack at a time. Hundreds or thousands of containers/cartons may move along the pick face throughout the day. Because the skill level and efficiency of the workers vary, and because some batches are more difficult to pick and "put" in the cartons, it is desirable to assign the workers along the pick face in a manner to optimize their efficiency throughout the day.

Another factor to consider is the sequence in which orders from customer stores need to be filled throughout the day. This is very often determined by, or decides, the order in which the trucks for particular stores are parked in a loading area for receiving filled containers. It is therefore also desirable to optimize the sequence in which the containers or cartons are moved along the length of the pick face. For example, the first store whose order must be satisfied may require goods from SKU batches on flow racks which are widely spaced along the pick face, and as that store's carton moves along the pick face it will skip over a substantial portion of the pick face between relevant SKU batches.

Prior art picking systems in which workers operate using written manifest or picking lists are less than ideal for modern distribution centers. This is due primarily to their inability to update or adjust picking assignments to reflect changing conditions, and their over-reliance on the memory of the worker running between flow racks and cartons with written list in hand. These prior art systems also have no real-time flexibility to allow for the correction of mismatches between SKU batch quantities and cartons.

More recently, a number of paperless, partially computerized order picking systems have been proposed to overcome the disadvantages of paper-based picking systems. Examples include U.S. Pat. No. 4,792,273 to Specht; U.S. Pat. No. 4,921,087 to Nakamura; JA 0147603; JA 0221004; JA 0162605; JA 0007605; JA 0267604.

JA 0007605 shows a movable picking truck on which the worker rides, the truck running along fixed shelves where goods are to be picked. The truck is driven by a tape-recorded program, and includes a display indicating the good or goods to be picked from the shelf.

JA 0267604 discloses a picking carrier on which the worker rides, the carrier moved around a circuit of fixed shelves. The carrier includes a computer controller 24 and is operated by a managing computer with radio transmission instructions. The controller is provided with indicators to aid the worker in making selections from the shelves or racks. The picked goods are stored on the carrier itself.

JA 0162605 discloses a number of quantity indicators arranged at fixed positions along a pick face, with a central conveyor belt to carry cartons along the pick face. Each quantity indicator is provided with a total quantity indicator and a completion key. The quantity indicator shows the number of goods to be picked from racks in a fixed picking zone, and the completion of picks from each rack is entered with the completion key. When all of the indicated picks have been made in the picking zone, the completion of picks is confirmed with the indicator.

JA 0221004 discloses a number of fixed racks or shelves spaced along a central conveyor, each shelf provided with a lamp indicator, a quantity display and a control unit. A second quantity display is provided on a movable gantry frame which can be moved along the line of shelves. The lamp indicator is lit when goods need to be picked from a particular shelf, the gantry is moved to that shelving unit, the quantity display on the gantry is connected to the central control unit on the shelf, and the number of goods to be picked is indicated on the gantry-mounted display.

JA 0147603 discloses a number of fixed, fluidized shelving units each provided with a fixed goods pickup verification indicator and a lamp indicator operated by a centralized control system.

While the above prior art paperless pick systems are an improvement over the older paper-based systems, they still do not provide the system flexibility and update capabilities needed to truly optimize picking operations. Moreover, their lack of flexibility requires structural redundancy in large applications, making them unsuitable for large scale use without greatly increasing the cost of such systems. These prior art systems are also extremely limited in terms of operator interface and input in the picking process to adapt to unforeseen conditions.

These and other drawbacks of the prior art are eliminated in the picking system of the present invention.

SUMMARY OF THE INVENTION

The present invention is a paperless, self-contained, dynamic partial case picking system for the efficient picking of goods delivered in batches to a pick face. The pick face is manned by workers who pick the goods and put them in cartons or containers to be shipped. The cartons are moved in cycles along the pick face and filled at "put" stations with goods from relevant SKU batches. A carton can be filled at one put station, or transferred among a number of put stations along the pick face until filled, whereupon it is placed on a conveyor or similar take away means for further processing and loading onto a truck for shipping.

Where the pick face is defined by the ends of a series of flow racks, the invention is suited to both "end picking", where goods are picked from batches arrived at the pick face ends of the flow racks, and "aisle picking", requiring some movement of the workers up and down the length of the flow racks to the relevant batches.

Cartons are moved along the pick face in move cycles according to a "flow wave", determined by the order in which batches of goods are to be picked, packed and shipped to satisfy the needs of a particular customer store or stores. This in turn is often determined by the order in which trucks for particular stores are parked at loading docks; the stores whose trucks are first in line to be loaded need to be satisfied first. A flow wave is completed when the cartons for the store or set of stores in the wave are satisfied. The next batch of cartons moving along the pick face forms a second flow wave, and so on.

The cartons can be moved in a continuous chain, or in discrete, spaced groups or waves.

The pick face is provided with worker-prompting operator display unit (ODU) means controlled by a computer. The ODU means comprise at least display means, and preferably also operator input means, in one embodiment a number of displays, indicators and input keys providing a two-way interface between the worker and the computer.

SKU batches arrive at the pick face to be distributed among the cartons at "put stations." In the "partial case picking" of the present invention, SKU batches are broken up among several cartons or shipping containers moving along the pick face, each receiving partial lots of items from one or more SKU batches before being shipped to the customer store. The computer controls the movement of a carton or set of cartons along the pick face in variable "move cycles" between relevant SKU batches along the pick face. Between move cycles the computer defines a number of "pick cycles", corresponding to the distribution of particular SKU batches from the flow rack(s) among one or more cartons. When the pick cycles for a move cycle are complete, i.e., when the relevant SKU batches at that location are distributed, the computer initiates another move cycle to move the partially-filled cartons to the next set of flow racks/SKU batches from which they require goods.

For each move cycle, the computer via the ODU display and indicator means assigns workers in that region to a "pick zone" comprising one or more flow racks/SKU batches from which goods are to be distributed. The pick zone can be varied for each move cycle as needed. Alternately, the "put zone" corresponding to the number of put stations/cartons to be serviced by that worker from an assigned pick zone can be varied as needed for each move cycle. In a preferred form, both the pick and put zones are varied as needed for each move cycle. This dynamic zone assignment greatly increases the efficiency of the picking operation.

During each pick cycle the workers distribute the items from a designated SKU batch in their pick zones among the cartons in their put zones. A number of successive pick cycles may be required before the next move cycle is initiated.

During each pick cycle the computer, via the ODU display and indicator means, can additionally tell the worker exactly how to distribute the items from each SKU batch among the cartons in his put zone.

Depending on the efficiency of workers available during a given move cycle, the picking difficulty of the relevant SKU batches, and other similar factors, the computer via the ODU units reassigns or reconfigures the pick and/or put zones for that move cycle.

When a carton is filled, it is closed and placed on a conveyor or other take-away means at the put station to be delivered to another part of the distribution center for processing or shipment to a customer. The computer then prompts the worker at that put station to open a new carton.

Depending on the goods required for a particular carton or set of cartons moving along the pick face to satisfy the current flow wave, it may be necessary to skip over substantial portions of the pick face from one move cycle to another before assigning pick and put zones and initiating pick cycles. This positioning is controlled by the computer, as determined from input corresponding to the sequence of arrival of SKU batches at the pick face and the loading order of trucks waiting to take the cartons to customer stores. The computer can be updated during the business day.

Accordingly, the system of the present invention provides dynamic zone assignment, matching workers, cartons and flow racks/SKU batches for efficient picking during each move cycle, and dynamic positioning to move cartons to relevant SKU batches along the pick face and bypass those areas of the pick face from which no goods are required. This allows nearly unlimited flexibility in tuning the picking system for maximum efficiency.

In one embodiment the cartons are moved along the pick face by a chain or series of linked carriers, trays, conveyor units or the like, each carrier or tray defining a put station on which a carton is placed for filling. The worker-prompting ODU display/interface units are carried by select put stations on the array, which is driven along the length of the pick face in discrete move cycles.

The series of linked carriers, trays, conveyor units or the like can be a continuous chain in which the cartons travel in a series of synchronous move cycles. In this embodiment the dynamic positioning of the cartons along the pick face from move cycle to move cycle is important, since the movement of any carton or group of cartons on the array affects the movement of all other cartons on the array. In general, the cartons are moved as far as possible along the pick face for each move cycle without skipping picks for any carton or set of cartons.

Alternately, the series of linked carriers, trays, etc. can comprise one or more independently mobile arrays of put stations provided with their own worker-prompting ODU units, further increasing the flexibility of the system. For example, the number of put stations in any independent mobile array can be adjusted to expand or contract it; cartons are moved more efficiently along the pick face without human interaction; several waves of cartons can be moved along the pick face without being affected by their respective move cycles.

In a preferred embodiment of the invention the independent mobile put station array comprises a train-type array running along a rail or rails between the pick face and a take-away conveyor system. The "train" includes an intelligent tug or engine carrying a computer. The tug pulls a number of connected trays or "cars", each defining a put station on which a carton is placed for filling. Each car carries an ODU unit connected to the tug computer in series.

The train moves along the pick face in variable-length move cycles determined by the computer to align it with those flow racks from which SKU batches are needed. The train bypasses the portions of the pick face whose SKU batches are not needed by the cartons on the train. Between move cycles, the train is reconfigured as needed into pick and/or put zones of varying size matched to particular workers.

Depending on the number of put stations or cars on the mobile array, portions of the array may be unused during certain pick cycles or even for entire move cycles.

In a further embodiment of the invention the ODU units comprise key panels with lighted displays to define the pick and put zones and assign them to a worker, and input keys with which the worker records such data as the number of picks and puts or the number of cartons opened and closed in a pick cycle. The input keys in a further embodiment can be used to adjust pick quantity or distribution during a pick cycle to accommodate unforeseen circumstances such as SKU batch shortages or surpluses, or the need to "split" a pick.

In a further embodiment the ODU units on the train cars define the put zones with bicolor light indicators, alternating colors for adjacent put zones. This provides a simple, easy to read signal to the worker(s) assigned to the put zones. If ODO units are placed along the pick face independent of the carton-moving structure, the bicolor light indicators can indicate alternating pick zones in similar fashion.

In an alternate embodiment of the invention, a single ODU unit is provided at the head of a train or movable put station array and is connected to a number of put zone indicators on the connected cars or trays. This is a simple and inexpensive system, and is envisioned for use where picking and putting will be fairly uniformly distributed among the cars on the train as it travels along the pick face.

These and other features of the present invention will become apparent upon further reading of the specification.

DETAILED DESCRIPTION OF THE DRAWINGS

Figure 1:
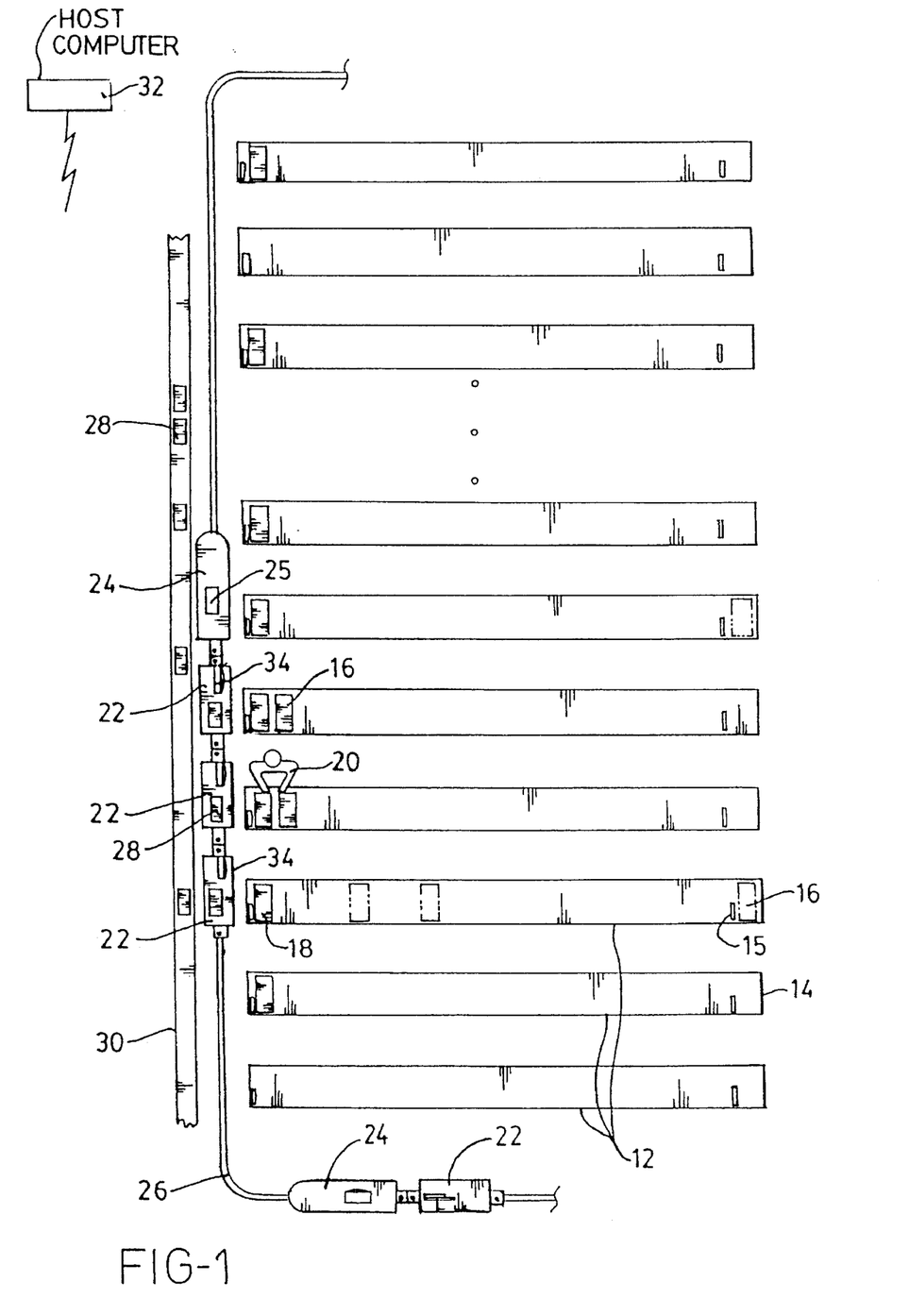
FIG. 1 is a schematic plan view of a flow rack and picking system according to one particular embodiment of the present invention.

Referring to FIG. 1, a picking system according to the present invention is shown as it would be arranged in a warehouse distribution center. A number of essentially parallel flow racks 12 have loading ends 14 to receive incoming goods in the form of pre-sorted "stock keeping unit" or "SKU" batches. Loading ends 14 of flow racks 12 are provided with barcode readers 15 to record a barcode SKU number on each batch as it is placed on the rack. Flow racks 12 in the illustrated embodiment are continuous conveyors, but can comprise continuous garment flow racks, inclined rollers, simple shelves, or other structures known to those skilled in the art. While in the illustrated embodiment the racks are shown as single-tiered, multiple-tier racks are known and can be used with the present invention.

Flow racks 12 deliver the SKU batches 16 to picking ends 18 in the order in which they were loaded at ends 14.

Picking ends 18 collectively define a "pick face" along which are stationed a number of workers or "pickers" 20.

Although the pick face in the illustrated embodiment is defined by ends 18 of a number of parallel flow racks, for the purposes of the present invention the form of the pick face itself is not critical, and can generally be defined as the region at which pre-sorted batches of goods arrive to be distributed by workers to a number of containers or cartons in a manner described below.

In the illustrated embodiment a number of "put" stations is defined by an array of interconnected trays or cars 22 driven by a computerized tug or engine 24 along a monorail track 26 running along the pick face. Each tray or car 22 has a surface suitable for supporting a carton or similar shipping container 28 as the "train" of tug 24 and cars 22 travels down track 26.

Figure 3:
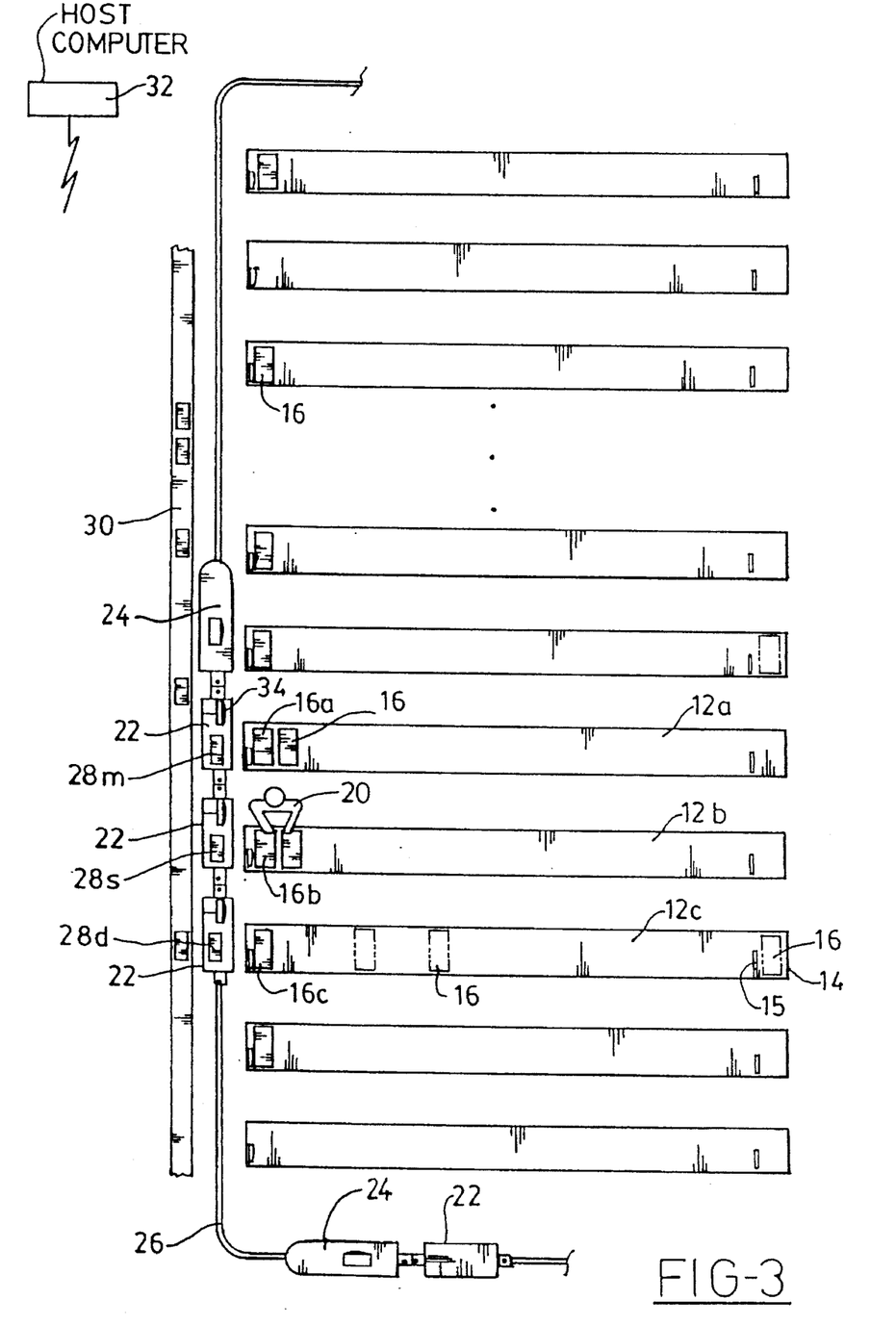
FIG. 3 is a simplified example of the picking system and method according to the present invention.
Figure 4:
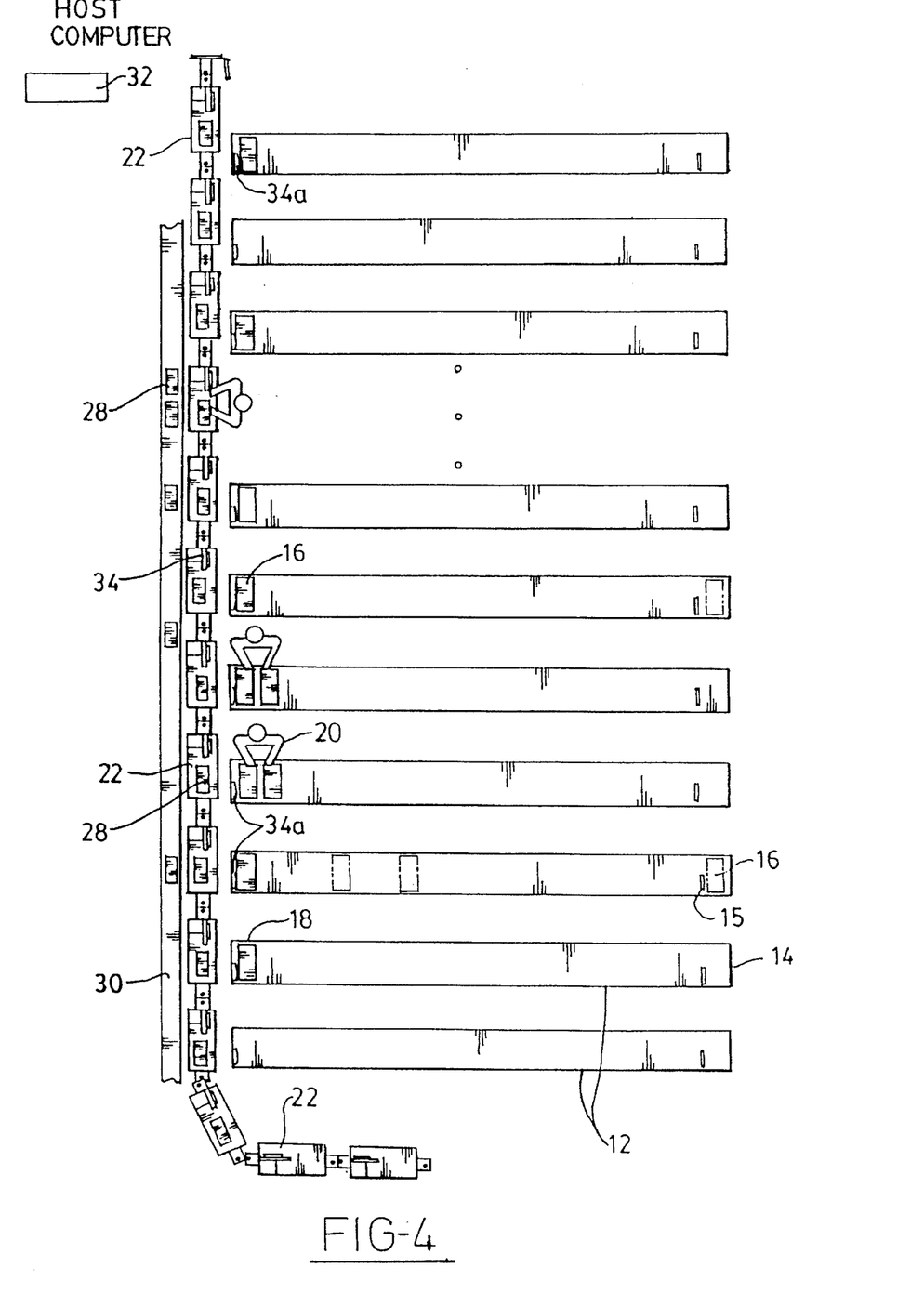
FIG. 4 is an alternate embodiment of the invention of FIG. 1.

Although in the illustrated embodiment of FIGS. 1–3 one or more independently mobile train-type put station arrays 24,22 is disclosed as the means for moving cartons 28 along the pick face, it is possible to use a single, continuous chain of cars or trays 22 as shown in FIG. 4, or even to provide a series of fixed put stations along the pick face in a manner described below.

Although a monorail track 26 is shown in the illustrated embodiment, it will be apparent to those skilled in the art that other forms of track can be used. Also, the type of "train" used can vary, as will be recognized by those skilled in the art.

Figure 2:
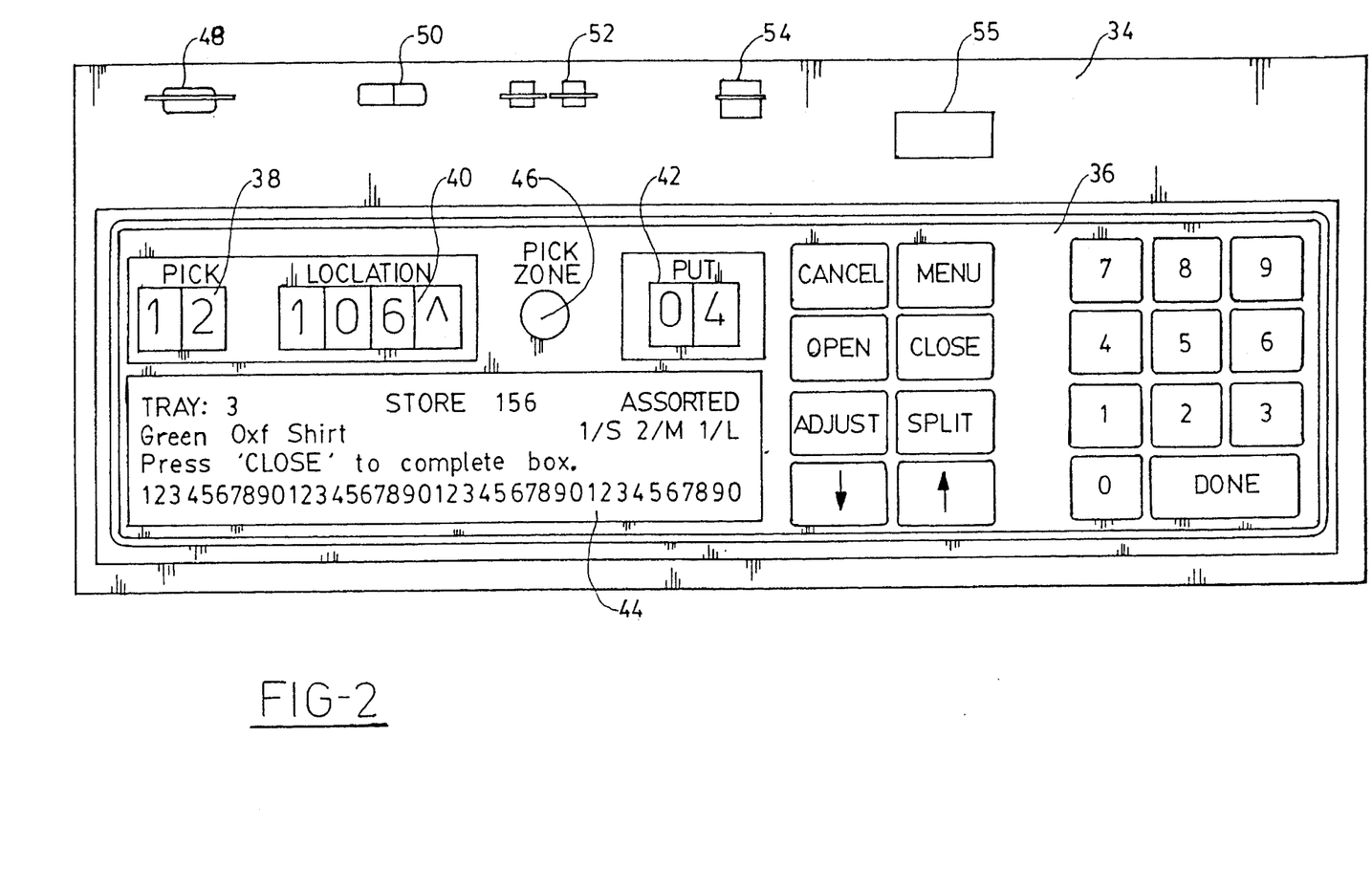
FIG. 2 is a front view of an operating display unit (ODU) according to the present invention.

In FIGS. 1–3 the tug 24 carries "local intelligence" in the form of a computer 25 shown schematically. Computer 25 controls the motion of train 24,22 along the pick face, and other functions described below in further detail. It will be apparent to those skilled in the art that almost any type of computer 25 can be used in tug 24, although in the illustrated embodiment computer 25 is an Intel 486.

A take-away conveyor 30 is positioned alongside the track 26 opposite the pick face and follows it in essentially parallel fashion along the pick face. The height of take-away conveyor 30 is matched to the height of the carton-supporting surfaces of cars 22 so that closed cartons 28 are easily pushed off cars 22 onto conveyor 30 by the workers. Conveyor 30 then carries the filled and sealed cartons 28 to other portions of the distribution center, for further processing and/or loading onto trucks or other transportation for shipment to customer stores.

Alternately, the tug 24 and cars 22 could take filled cartons directly to a loading area after leaving the pick face, but some sort of local takeaway system, human or mechanical, is preferred.

The movement of tug 24 along track 26 is controlled by tug computer 25, which receives input data from a central dispatch host computer 32 via an RF link in a known manner. The programming in tug computer 25 operates the motor of tug 24 to position it along track 26 in response to the input from central dispatch computer 32.

The central dispatch computer 32 provides a convenient, centralized interface to update the data on which tug computer 25 relies to position cars 22 along the pick face. Factors such as worker availability, SKU batch arrival, location of and coordination with other tugs 24 (if multiple arrays 24,22 are used), and other information recognized by those skilled in the picking art as relevant to tug position can be sent to the tug computer 25 for appropriate action by its programming.

Each car 22 connected to tug 24 in the illustrated embodiment is provided with a microprocessor based operator display unit (ODU) 34 having a plurality of LED displays, indicators and input keys. The ODU units 34 are shown in detail in FIG. 2.

In the illustrated embodiment of FIG. 2, each ODU 34 comprises a membrane-type keyboard 36, sealed against moisture and contamination for reliable performance. It also includes high visibility LED "pick" display 38, "location" display 40, and "put" display 42. A 4×40 character LCD display panel 44 provides operator instructions and information feedback.

A bicolor "pick range" or "put zone" LED 46 is provided and can be selectively lit one of two colors for purposes described below. Although a single bicolor indicator 46 is illustrated, multiple single-color indicators can also be used.

In the illustrated embodiment the pick display 38 and location display 40 are lit in similar but different colors (e.g., red and orange), and the put display 42 is lit in a contrasting color (e.g., green) for maximum human factor discrimination.

Keyboard 36 is provided with "cancel", "menu", "open", "close", "adjust", "split" and "↑" and "↓" keys, a plurality of numeric entry keys, and a "done" key, performing functions described below.

The rear face of each ODU 34 is provided with a number of input/output connectors shown schematically on the front face of ODU 34 in FIG. 2 at U.S. Pat. No. 48,50,52,54. In the illustrated embodiment connector 48 is a nine-pin DB (AT computer compatible) printer output port to drive a barcode printer (not shown), optionally mounted on one or more cars 22 in the array. Connector 50 is a loop-thru set of RS-485 standard RJ-11 telephone-type power connectors to support a daisy chain feed of communications and power between each ODU 34 and the tug computer 25. A simple communications protocol permits interaction of tug computer 25 with the individual input/output devices (printer, barcode reader, keyboard, display panel, LED indicators, etc.) on or connected to each ODU. Connectors 52 are power connectors utilizing a mating screw post cable connector for ease of field wiring. Connector 54 is a DIN connector to accept wand-type or gun-type barcode readers (not shown), optionally carried on one or more cars in the array.

ODU unit 34 also preferably includes a small speaker shown schematically at 55 to provide an auditory signal, for example a "beep", to alert the workers to such events as initiation or termination of move and pick cycles, and to prompt the worker if input is requested through the numeric input keys.

While the ODU 34 in the illustrated embodiment is essentially a "dumb" terminal, it will serve to handle local device drivers, thus buffering or off-loading the tug computer 25 from excessive input/output management. For example, barcode decoder hardware is built (and optionally configured) into the ODU control logic. These and other variations in the hardware of the ODU will be apparent to those skilled in the art.

In an alternate embodiment of the invention, one or more cars 22 can additionally be provided with a projector connected to the ODU unit 34 to project or transmit in redundant fashion at least some of the information displayed on ODU unit 34 onto screens on the pick face ends 18 of flow racks 12. A projector and screen arrangement could be used, or ODU units 34a could be redundantly mounted on flow rack ends 18 to mirror at least some of the information on ODU units 34 on cars 22, thus eliminating the need for worker 20 to remember the information when turning back and forth between flow racks 12 and cars 22. For example, where ODU units 34 are placed along the pick face as shown in FIG. 4 (redundantly or otherwise), the bicolor zone indicators 46 can designate alternating pick zones rather than put zones.

Referring now to FIG. 3, a simplified example of the operation of the picking system of the present invention is shown. It will be understood by those skilled in the art that, once the operation of the inventive system is shown in this simplified form, it is easily applied to larger and more complicated systems, which are in effect simply repetitions and minor variations of the basic system.

In FIG. 3, tug 24 has positioned an array of three trolley cars 22 adjacent three flow racks 12a,12b,12c after a first move cycle. A single worker 20 services flow racks 12a–c in an "end picking" arrangement. SKU batches 16a,16b,16c have arrived at the pick face on flow racks 12a,12b,12c, respectively. In the illustrated embodiment, SKU 16a comprises twelve green shirts; SKU 16b comprises twelve blue shirts; and SKU 16c comprises twelve red shirts.

Each trolley car 22 supports a carton 28, each carton 28 bound for a different customer store. In the illustrated example carton 28M is bound for a store in Manchester; carton 28S is bound for a store in Saline; and carton 28D is bound for a store in Dexter.

The current inventory and order of the SKU batches 16 in flow racks 12 is maintained in central dispatch computer 32, entered by workers (not shown) at the loading ends 14 of racks 12 with barcode readers 15 communicating with dispatch computer 32 by RF link. Alternately, the batches could simply be loaded onto the flow racks, and subsequently "wanded" at the pick face by barcode readers on ends 18 or on cars 22. In response to orders from the stores in Manchester, Saline and Dexter (the first "flow wave"), the distribution warehouse's supervisory computer (not shown) has provided the central dispatch computer 32 with a "distribution" comprising an assignment of quantities of the different SKU batches among the stores that ordered them. Since in FIG. 3 tug computer 25 has been informed by central dispatch computer 32 that SKU batches 16a–c of green, blue and red shirts are now at the pick face, and that stores in Manchester, Saline and Dexter each want some green, some blue and some red shirts, tug 24 and cars 22 have been moved into position near racks 12a,12b,12c for this move cycle. For simplicity of explanation, in the illustrated embodiment of FIG. 3 each store wants four green shirts, four blue shirts, and four red shirts.

As tug 24 comes to a stop, tug computer 25 via ODU units 34 assigns workers "pick" and "put zones" for that move cycle based on criteria such as the skill level and speed of workers available on that shift, the picking difficulty of the items in the SKU batches, the number of expected carton closings and other suitable criteria. Bicolor LED put zone indicators 46 light up the same color for all adjacent cars in a contiguous put zone, and the worker's ID number or name can be displayed on LCD panel 44 for each of those cars. The worker now has an assigned "put zone", or clearly-identified series of cars 22 and associated cartons 28 which he will be required to service for the current move cycle. In FIG. 3 the put zone for worker 20 is all three cars 22. The pick zone in the illustrated embodiment of FIGS. 1–3 is not displayed in its entirety in the manner of the put zone, but in sequential fashion during pick cycles as described below. In FIG. 4, however, ODU units 34a on the pick face display the pick zones in their entirety, bicolor pick zone indicators 46 matching the color of the corresponding put zone indicators on cars 22.

The "pick zone" assigned to worker 20 in FIG. 3 includes flow racks 12a–c, the tug computer 25 having determined that the three-car put zone requires items from SKU batches 16a–c, and that the skill of worker 20 in view of the picking difficulty of the batches requires only one worker to service the cars for the upcoming pick cycles.

In the illustrated embodiment of FIG. 3, the first pick cycle begins by identifying the first SKU batch in the assigned pick zone which is to be picked and loaded into cartons in the put zone during that pick cycle. In FIG. 3 the location display 40 on all three ODU units 34 in the worker's put zone will display an identifier, such as flow rack number, to direct worker 20 to the proper SKU batch in his pick zone. In FIG. 3, location display 40 for the first pick cycle directs worker 20 to flow rack 12a (e.g., rack number "106") holding SKU batch 16a (green shirts). The pick display 38 on each ODU 34 in the worker's put zone displays the total number of items to be picked from the SKU batch in that pick cycle; here, the total is 12 green shirts, which is the entire quantity in SKU batch 16a.

Each put display 42 on ODU unit 34 in the put zone displays the number of green shirts from the total pick of 12 to be "put" into the carton on that car. In FIG. 3, the put display 42 will register "04" on each ODU unit 34 associated with cartons 28m, 28s, 28d. Worker 20 accordingly selects 12 green shirts from SKU batch 16a, and puts four of the green shirts into each carton 28M, 28S, 28D. As the correct number of shirts is placed in each carton for that cycle, the worker presses the "done" button on keyboard 36 of the ODU unit 34 for that carton to indicate pick cycle completion for that carton. In the system of FIG. 3, the dispatch computer 32 responds to a "done" signal for one of the cartons by decrementing the "pick" quantity (by the amount put in that carton) on display 38 for all ODU units 34 in the put zone. This assists the worker in the event he was unable to acquire the entire "pick" quantity on the first load and has to go back for more.

This decrementing "pick" quantity is also an error check indicator, since at the last car in the put zone the "pick" and "put" quantities on displays 38 and 42 should match each other as well as the number of items in the worker's hands.

When the last four green shirts are placed in the last carton in the put zone, pressing the "done" button decrements the total "pick" quantity in display 38 to zero, ending that pick cycle and signaling the tug computer 25 to begin the next pick cycle.

In FIG. 3, the second pick cycle involves the distribution of the blue shirts in SKU batch 16b on rack 12b. In the illustrated example the put zone is the same, i.e. , cartons 28m, 28s, 28d, the pick zone is the same (racks 12a–12c), and the number of workers required (one) is the same.

In the second pick cycle, worker 20 will again be prompted by the ODU displays and indicators associated with cartons 28m, 28s, 28d in his put zone to pick 12 blue shirts, and distribute four into each carton 28m, 28s, 28d, decrementing the total "pick" quantity in display 38 with the "done" button as each carton is satisfied. When all of the blue shirts have been distributed, the tug computer 25 signals the beginning of the third pick cycle in which the red shirts of SKU batch 16c in rack 12c are distributed among cartons 28m, 28s, 28d in the manner described above.

When the pick cycles in that current move cycle have been completed, tug computer 25 will move the array 24,22 to the next region of the pick face at which relevant SKU batches are located. The computer then assigns new pick and put zones to the available workers for that new move cycle. For example, in the next move cycle worker 20's pick zone might only include two flow racks, and his put zone might include more or fewer cars 22 on the array.

In the illustrated embodiment employing an independent mobile put station array 24,22, it is envisioned that one or more workers 20 will follow the array 24,22 as it moves along the pick face. It is possible, however, that workers can be stationed in relatively fixed regions of the pick face and wait for the cartons or array to arrive.

Occasionally a carton in the put zone will fill before the "pick" quantity in that cycle is completely distributed. In that case, worker 20 must "split" the pick quantity before closing that carton, and then open a new carton to finish the pick distribution. This is done by pressing the "split" button on ODU keyboard B6 associated with the full carton. The system displays a prompt message on LCD panel 44, e.g., "how many put in current carton?". The worker enters the number of items he managed to put into that carton with the numeric input or arrow keys and then presses the "done" button. The LCD panel 44 displays a message such as "split complete", and the worker then presses the "close" button. Pressing the "close" button prompts the system to print a shipping label and/or packing list on the nearest ODU-mounted printer (not shown) distributed among the cars 22 or possibly on each car. The worker attaches the shipping label and/or packing list to the "closed" carton and pushes the carton onto take-away conveyor 30, which carries it off to be sealed and optionally checked against the packing list at another location, and finally shipped.

Since the worker now has an empty car 22, he can start a new carton 28 by pressing the "open" button on ODU keyboard 36. If the previous carton was closed due to a "split", the system will assign the same store and remaining pick quantity on the ODU 34. The worker can then complete the pick cycle in the manner described above. Otherwise the system can assign a different store to that car.

To assign a new store to a car, pressing the "open" button on key panel 36 sends a request from the tug computer 25 to central dispatch computer 32 for all current car assignments. As explained above, stores are grouped in "flow waves" on a schedule. A store remains in the current flow wave so long as there are a certain number of cartons to be sent to that store (this is referred to as the "wave limit"). The tug computer 25 accordingly first chooses any store whose carton reservation is unsatisfied. Generally stores have a reservation of zero cartons, but the system operator can set up the system such that a given number of cars for certain stores is maintained, regardless of the contents of the flow racks.

If no stores with unsatisfied carton reservations are found, the tug computer 25 next looks for a store in the current flow wave whose demand can fill a carton with an SKU batch currently on the pick face, taking into account stores to which one or more cars have already been assigned.

If no such stores are found, the tug computer will next look for a store in the current flow wave for which picks for the store would deplete an SKU batch currently on the pick face even though it would not fill the new carton.

If no such stores are found, the tug computer next looks for a store in the current flow wave which needs items from an SKU batch in the flow racks, not necessarily at the pick face yet, and enough to fill at least one carton.

If no such stores are found, the tug computer 25 next looks for a store which is in the current flow wave and which needs items from an SKU batch in stock, whether or not it is in the flow racks or the store's demand will fill a complete carton.

If no such stores are found, the tug computer 25 will finally look for stores in the next flow wave, applying the above criteria in the same order until a new box can be opened.

When a particular SKU batch is depleted, this will be indicated on the ODU; e.g., the "pick" quantity on the ODU units will flash. Normally, the quantity remaining in the SKU batch will match the "pick" number in display 38. To begin using a new SKU batch, the worker first confirms the new batch's identity to the system. In one embodiment, the picker presses the open button and uses a barcode reader attached to one of the ODU units 34 in his put zone to identify the new SKU batch to the tug computer 25. Or, alternately or as a backup function, the worker can enter the new SKU batch number via any one of ODU panels 34 by entering the SKU number via the numeric input keys on key panel 36, followed by the "done" key.

In the illustrated example of FIG. 3, the worker would perform this procedure after any or all of SKU batches 16*a–c* of green, blue and red shirts were depleted during the pick cycles.

Occasionally there may be a shortage or surplus of the items from a particular SKU batch due to counting errors by the feeders at loading ends 14 or the pickers at the pick face.

If there is a shortage, the worker presses the "adjust" button on the ODU key panel 36 of the car/carton where the product ran out. The system prompts a message such as "quantity put=?"on LCD display 44, and the worker presses the down "↓" key to indicate a shortage. This causes the display to indicate the original "planned" quantity, minus one. This number can then be decreased or increased with each press of the "↑" and "↓" keys, respectively. Alternately, the worker can enter the actual put number with the numeric input keys followed by the "done" key. This procedure completes the pick cycle for that particular SKU batch, and cancels requests for remaining stores.

If a surplus occurs, the worker again presses the "adjust" button, the system prompts "how many?", the worker presses the up "↑" key followed by "↑" or "↓" adjustments, or the number of surplus items with the numeric input keys, and presses the "done" key. The tug computer 25 (or central dispatch computer 32) then decides whether to distribute the surplus among the stores, or to hold the surplus product until it can be removed physically by a supervisor, based on the items in that particular SKU batch and the quantity of surplus. If the system decides to distribute the surplus among the stores, it automatically adjusts the pick quantity for each store in the put zone upwardly. At the end of the pick cycle, the worker starts a new SKU batch in the normal manner.

If the surplus items are held for supervisor removal, the supervisor takes the product and corrects the flow rack inventory via the dispatch computer 32.

It will be clear to those skilled in the art that, although the example of FIG. 3 is simplified, the apparatus and method of the invention described are the primary or basic building blocks of a more complicated or large scale system. Depending on the number of flow racks along the pick face, the picking difficulty of the items in the SKU batches, the number of workers available to service the array and the flow racks and their relative skill level in picking, the number of put stations or cars 22 carried by tug 24, the order in which store orders are presented in the flow wave, and the location of SKU batches from which those orders must be satisfied along the pick face, the dynamic positioning and zone assignment of the inventive system will compensate for each move cycle according to the programming of tug computer 25 in accordance with the principles described in the example above.

It will also be apparent to those skilled in the art that more than one independently mobile "train" 24,22 can be used at one time, depending on the size and complexity of the distribution center and the flow rack arrays. Tracks with multiple branches, closed loops, or even a straight line track in which tug 24 merely shuttles cars 22 back and forth along the pick face are all possible variations.

Or, in a simplified system a series of fixed put stations and ODU units 34 can be positioned along the pick face, with the cartons moved in flow waves and move cycles among the put stations by human or mechanized means in accordance with the principles described above. In this case the put stations would "arrive" in a "move cycle" as the central dispatch computer selectively designated regions along the pick face via the ODU units in a number of "move cycles."

Although the ODU units 34 are illustrated as carried by cars 22, they could alternately be carried by workers as they follow the cars 22 or cartons 28 along the pick face.

In the illustrated embodiment the central dispatch computer 32 communicates with tug computer 25, handles ground-based input/output, and provides a user interface. It is capable of presenting system status, coordinating product flow, and coordinating and managing multiple "trains" or similar mobile put station arrays. The software of the illustrated embodiment runs on a 486-based real time variant of System V UNIX. Central dispatch software components include system services utilities providing a set of covers to the operating system, allowing easy porting between operating systems; a condition handler to manage state or condition information, and activate reporting system components when appropriate; a utility task component to handle miscellaneous functions, such as setting date, time, etc.; a topological database to be downloaded into the tug computer 25, and allow the operator to perform reconfiguration tasks on the database; a tug manager program to dispatch tugs 24 to perform various tasks, and keep them out of each other's way if there are multiple tugs (contract-net algorithms can be used here to determine optimal scheduling); an operator interface component, illustratively a GUI interface program; and an RF network interface component to manage the communication links between central dispatch 32 and tugs 24, barcode wand or gun-type readers, and RF terminals 15 on the flow racks.

The tug computer 25 can be suitably programmed to achieve the dynamic positioning and zone assignment described above by those skilled in the art. However, the tug software of the illustrated embodiment optionally includes the following components: an input/output subsystem (IOS) providing access to digital and analog inputs and outputs controlled by the tug computer. For digital signals, the IOS handles a variety of filtering functions, including inversion, on-delays and off-delays. For both signal types (analog and digital), the IOS component can notify client tasks when signals reach certain values. The IOS system also "hides" the physical input/output system from its client components, so signals may be moved among client components without affecting the client components using those signals. A motor control component is provided to drive the main drive motor (not shown) of tug 24. The motor control software sends I/O commands to a VFD motor controller, achieving precise velocity control and both forward and reverse directions. Acceleration profiles are determined by setting parameters in the VFD motor controller. As the system runs "open loop" between track location markers, the motor control software provides a navigation control component with changes in position. Using feedback from the navigation control detection of track markers, the motor control also adjusts its conversion coefficients (signal output to distance traveled) over time, and stores its data in non-volatile memory. This corrects for drifts due to drive wheel wear, or other such variables. A navigation control software component uses the data from the motor control component and notification of track marker detection from the input/output subsystem, to keep track of the current position of the train according to a previously-determined coordinate system. Using a topological database output, the navigation control component computes routes to the pick zones for the move cycles.

The tug software should also include the topological database mentioned above, containing the track layout information, including locations of flow racks, track switches, incline/decline sections, track markers, etc. From time to time, as necessary, the topological database can be updated from information from the central dispatch computer 32.

Although not necessary for the apparatus and method of the present invention, an obstacle and collision avoidance handler software component is also desirable if a "train"-type mobile put station array is used.

The tug computer 25 has a dispatcher interface component communicating with the central dispatch computer to provide information on the tug status and location, as well as statistical data. The dispatcher interface component receives topological database updates from the dispatcher, induction requests (i.e., pick and put zone assignments for the various pick cycles), and location of other mobile put station arrays if used.

Also, the tug software includes a system service utilities component for providing routines for accessing the operating system, monitoring power fail hardware on a multifunction board, and other miscellaneous utilities.

The above software components are of course variable depending on the desires of the programmer, and can take various forms as will be understood by those skilled in the art. Much of the software described above will be unnecessary in a fixed put station array using the ODU units and control methodology of the present invention. Also, certain portions of the software components described above would not be needed depending on the complexity of the mobile put station array arrangements.

The foregoing description is of an illustrative embodiment, and is not intended to be limiting, as many variations and modifications of the invention will lie within the scope of the appended claims.

For example, although in the illustrated embodiment the system "intelligence" is primarily local (i.e., on the arrays 24,22), for systems using a continuous chain put station array as in FIG. 4, or a "fixed" put station array, the primary programming could be located in a central dispatch computer. The programming necessary for the dynamic positioning and zone assignment of the present invention will vary according to the size of the picking operation, the factors taken into consideration by the programmer, the carton-moving means employed, and other relevant information which will be apparent to those skilled in the art. The exact nature of the car or tray structure in the illustrated mobile array examples can vary within the scope of the invention, as can the form of the ODU units.

We claim:

1. A paperless, self-contained partial case picking system for efficient distribution of goods to customer stores, comprising:

flow rack means onto which goods are loaded in presorted batches to be transported to a pick face where they are distributed by workers among containers bound for customer stores;

one or more mobile, independently-driven put station arrays comprising interconnected arrays of cars defining container-supporting put stations, each mobile put station array moving along a predefined path along the length of the pick face in a series of independent move cycles;

worker-prompting display/interface (ODU) means carried by each put station, the ODU means including display means defining a pick zone for a worker comprising one or more batches of goods to be serviced by a worker, a put zone comprising one or more put stations assigned to receive goods from the batches in the pick zone, and a distribution of goods from each batch in the pick zone among each container in the put zone for each of one or more pick cycles, and operator input means to record the distribution of goods per pick cycle; and computer means carried by each mobile put station array, the computer means in communication with the ODU means on each car, the computer means controlling the movement of the mobile put station array in a series of move cycles of variable length along the pick face, the computer means further varying the pick and put zones for each worker servicing the array, as needed, for each move cycle.

2. A system as defined in claim 1, wherein the computer means further comprises a central dispatch computer communicating with the array-mounted computer means.

3. A system as defined in claim 2, wherein the central dispatch computer providing an interface between the computer means on separate mobile put station arrays.

4. A system as defined in claim 1, wherein the operator input means on the ODU means include means to record the opening and closing of new containers.

5. A system as defined in claim 4, wherein the operator input means further include means to adjust the distribution of goods from a batch during a pick cycle.

6. A system as defined in claim 1, wherein the ODU means include a multicolor light array for identifying one or more contiguous put stations in a put zone and for distinguishing between adjacent put zones.

7. A system as defined in claim 1, wherein the pick face includes display means displaying in redundant fashion at least some of the information displayed on the ODU means.

8. A system as defined in claim 1, wherein the display means on the ODU means include means to prompt the worker to open and close new containers.

9. A system as defined in claim 1, wherein the mobile put station array further includes electronic batch identifier means connected to the ODU means on the array.

10. A system as defined in claim 1, wherein the ODU means further include auditory indicator means.

11. A paperless, self-contained partial case picking system for efficient distribution of goods to customer stores, comprising:

a pick face at which goods arrive in batches to be picked by a worker at the pick face;

a plurality of put stations at least temporarily defined adjacent the pick face to hold containers selectively placed thereon for filling with goods from the batches;

means for moving containers along the pick face in a series of move cycles to be selectively filled with goods from batches, the means for moving the containers along the pick face comprising one or more independently mobile put station arrays moved along the pick face in asynchronous move cycles, the independently mobile put station arrays comprising a plurality of interconnected cars movable on a defined path along the length of the pick face, the cars defining container-supporting put stations;

worker-prompting display/interface (ODU) means provided along the pick face for viewing by workers at the pick face, the ODU means including display means defining a pick zone for a worker comprising a portion of the pick face to be serviced by that worker, a put zone comprising one or more containers assigned to receive goods from the batches in the pick zone, and a distribution of goods from each batch in the pick zone among containers in the put zone for one or more pick cycles;

computer means communicating with the ODU means, the computer means selectively varying the pick zone for each worker via the ODU display means for each move cycle as needed, the computer means operating the container-moving means in a series of move cycles in which a container or set of containers is moved along the pick face until a container requires goods from one or more batches at a particular region of the pick face.

12. A system as defined in claim 11, wherein the ODU means further includes operator input means to record the distribution of goods in a pick cycle.

13. A paperless, self-contained partial case picking system for efficient distribution of goods to customer stores, comprising:

a pick face at which goods arrive in pre-sorted batches to be picked by a worker at the pick face;

a plurality of put stations at least temporarily defined adjacent the pick face to hold containers selectively placed thereon for filling with goods from the batches;

means for moving containers along the pick face in a series of move cycles to be selectively filled with goods from batches, the means for moving the containers along the pick face comprising one or more independently mobile put station arrays moved along the pick face in a asynchronous move cycles, the independently mobile put station arrays comprising a plurality of interconnected cars movable on a defined path along the length of the pick face, the cars defining container-supporting put stations;

worker-prompting display/interface (ODU) means provided along the pick face for viewing by workers at the pick face, the ODU means including display means defining a pick zone for a worker comprising a portion of the pick face to be serviced by that worker, a put zone comprising one or more containers assigned to receive goods from batches in the pick zone, and a distribution of goods from each batch in the pick zone among containers in the put zone for one or more pick cycles;

computer means communicating with the ODU means, the computer means selectively varying the put zone for each worker via the ODU display means for each move cycle as needed, the computer means operating the means for moving containers along the pick face in a series of move cycles in which a container or set of containers is moved along the pick face until a container requires goods from one or more batches at a particular region of the pick face.

14. A system as defined in claim 13, wherein the ODU means further includes operator input means to record the distribution of goods in a pick cycle.

15. A paperless, self-contained partial case picking system for efficient distribution of goods to customer stores, comprising:

a pick face at which goods arrive in pre-sorted batches to be picked by a worker at the pick face;

a plurality of put stations at least temporarily defined adjacent the pick face to hold containers selectively placed thereon for filling with goods from batches:

means for moving containers along the pick face in a series of move cycles to be selectively filled with goods from the batches, the means for moving containers along the pick face comprising one or more independently mobile put station arrays moved along the pick face in asynchronous move cycles, the independently mobile put station arrays comprising a plurality of interconnected cars movable on a defined path along the length of the pick face, the cars defining container-supporting put stations;

worker-prompting display/interface (ODU) means provided along the pick face for viewing by workers at the pick face, the ODU means including display means defining a pick zone for a worker comprising a portion of the pick face to be serviced by that worker, a put zone comprising one or more containers assigned to receive goods from batches in the pick zone, and a distribution of goods from each batch in the pick zone among containers in the put zone for one or more pick cycles;

computer means communicating with the ODU means, the computer means selectively varying the pick zone and put zone for each worker via the ODU display means for each move cycle as needed.

16. A system as defined in claim 15, wherein the ODU means further includes operator input means to record the distribution of goods in a pick cycle.

17. A system as defined in claim 15, wherein the computer means further comprises a central dispatch computer communicating with the array-mounted computer means.

18. A system as defined in claim 17, wherein the central dispatch computer provides an interface between the computer means on separate mobile put station arrays.

19. A system as defined in claim 15, wherein the operator input means on the ODU means include means to record the opening and closing of new containers.

20. A system as defined in claim 15, wherein the operator input means further include means to adjust the distribution of goods from a batch during a pick cycle.

21. A system as defined in claim 15, wherein the ODU means include a multicolor light array for identifying one or more contiguous put stations in a put zone and for distinguishing between adjacent put zones.

22. A system as defined in claim 15, wherein the pick face includes display means displaying in redundant fashion at least some of the information displayed on the ODU means.

23. A system as defined in claim 15, wherein the display means on the ODU means include means to prompt the worker to open and close new containers.

24. A system as defined in claim 15, wherein the mobile put station array further includes electronic batch identifier means connected to the ODU means on the array.

25. A system as defined in claim 15, wherein the ODU means further include auditory indicator means.

* * * * *